US009058161B2

(12) United States Patent
Noh et al.

(10) Patent No.: US 9,058,161 B2
(45) Date of Patent: Jun. 16, 2015

(54) UNIVERSAL POWER SUPPLYING APPARATUS AND UNIVERSAL POWER SUPPLYING METHOD

(71) Applicant: SAMSUNG ELECTRO-MECHANICS CO., LTD., Suwon, Gyunggi-do (KR)

(72) Inventors: Young Seung Noh, Gyunggi-do (KR); Sang Kyoo Han, Daejeon (KR); Moon Hwan Keum, Gyunggi-do (KR); Bo Mi Lee, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 130 days.

(21) Appl. No.: 13/781,310

(22) Filed: Feb. 28, 2013

(65) Prior Publication Data

US 2014/0111175 A1 Apr. 24, 2014

(30) Foreign Application Priority Data

Oct. 18, 2012 (KR) .......................... 10-2012-0116167

(51) Int. Cl.
  *G05F 1/56* (2006.01)
  *G06F 1/26* (2006.01)
(52) U.S. Cl.
  CPC ...................................... *G06F 1/263* (2013.01)
(58) Field of Classification Search
  CPC ............. G05F 3/24; G05F 1/56; G05F 1/577; G05F 3/1584; G05F 3/1588; G05F 1/575
  USPC ................. 323/265, 267, 268, 271, 273, 282; 307/104
  See application file for complete search history.

(56) References Cited

U.S. PATENT DOCUMENTS 8,258,761 B2 *  9/2012  Hammerstrom ............... 323/207
8,370,650 B2 *  2/2013  Paniagua et al. .............. 713/300

(Continued)

FOREIGN PATENT DOCUMENTS

KR    10-2000-0051314 A    8/2000
KR       2006-0062711 A    6/2006

(Continued)

OTHER PUBLICATIONS

Korean Office Action issued in Korean Application No. 10-2012-0116167 dated May 29, 2014, w/English translation.

(Continued)

*Primary Examiner* — Adolf Berhane
(74) *Attorney, Agent, or Firm* — McDermott Will & Emery LLP

(57) ABSTRACT

There are provided a universal power supplying apparatus and a universal power supplying method that can be universally used for various types of devices having a variety of voltage and current levels of a driving power. The universal power supplying apparatus includes a power supplying unit that converts an input power into a driving power having a previously set voltage level and supplies the converted power, a power recognizing unit that outputs a recognized voltage having the previously set voltage level to an output terminal from which power is output to recognize connection of a device, and controls a power output of the power supplying unit according to a detected rated output, and a detecting unit that provides a detection voltage having the previously set voltage level to the output terminal.

20 Claims, 4 Drawing Sheets

(56) References Cited

U.S. PATENT DOCUMENTS

| | | | |
|---|---|---|---|
| 8,558,411 B2 * | 10/2013 | Baarman et al. | 307/104 |
| 8,699,241 B2 * | 4/2014 | Ryu et al. | 363/21.12 |
| 2006/0123254 A1 | 6/2006 | Lim et al. | |
| 2012/0256491 A1 | 10/2012 | Ryu et al. | |
| 2014/0035387 A1 * | 2/2014 | Baarman et al. | 307/104 |

FOREIGN PATENT DOCUMENTS

| KR | 2009-0031085 A | 3/2009 |
|---|---|---|
| KR | 2011-0062549 A | 6/2011 |
| KR | 10-1188041 B1 | 10/2012 |

OTHER PUBLICATIONS

Notice of Office Action Korean Patent Application No. 10-2012-0116167 dated Oct. 18, 2013 with English translation.

Korean Office Action dated Aug. 25, 2014 issued in the corresponding Korean Patent Application No. 10-2014-0096721 (English translation).

* cited by examiner

UNIVERSAL POWER SUPPLYING APPARATUS AND UNIVERSAL POWER SUPPLYING METHOD

CROSS-REFERENCE TO RELATED APPLICATIONS

This application claims the priority of Korean Patent Application No. 10-2012-0116167 filed on Oct. 18, 2012, in the Korean Intellectual Property Office, the disclosure of which is incorporated herein by reference.

BACKGROUND OF THE INVENTION

1. Field of the Invention

The present invention relates to a universal power supplying apparatus and a universal power supplying method capable of supplying power to a variety of devices.

2. Description of the Related Art

Recently, portable electronic devices have tended to be systematic between devices, digital, wireless, multimedia-capable, smart, and multifunctional. Among these aspects of portable electronic devices, as social interest in multimedia increases, small-sized portable multimedia-capable devices have come to the forefront.

In particular, as mobile devices including smart phones and tablet PCs have come to prominence as new information devices, a new technical requirement for a driving power supplying apparatus such as an adapter for charging a battery of information devices has increased.

Although only standby power regulations are officially present with respect to existing driving power supplying apparatuses, since a variety of functions including touch screen data input have been added to mobile devices, an influence on a main body needs to be significantly reduced while existing driving power supplying apparatuses charge devices.

Meanwhile, as a variety of mobile devices are used, research into a new driving power supplying apparatus capable of supplying a required power voltage to a variety of different mobile devices by using a single driving power supplying apparatus is required.

Mobile devices use various power rating specifications with respect to various types of mobile devices, and thus a dedicated driving power supplying apparatus for each device is needed. Accordingly, users need to have an amount of driving power supplying apparatuses equal to the number of mobile devices they possess, as well as facing a problem of expense.

Thus, to solve these problems as described above, in a case in which mobile devices share an input voltage, for example, 5V, in the case of a device in which required input power is relatively high, such as a notebook computer, a large amount of current is required, and thus a separate heat dissipation tool for absorbing heat generated from devices is required.

That is, a size of a driving power supplying apparatus inevitably increases, causing an increase in the price thereof.

On the contrary, in a case in which an output voltage is increased to, for example, 12V, an amount of current is decreased in a device (a smart phone, or the like) having a lower input voltage. However, to manufacture a small-sized and low-priced device, the user must use a relatively cheap device having a low withstand voltage, and then use a device having a high withstand voltage, increased within a range of the input voltage. Also, since a device having a high withstand voltage generally needs to have a large size and to be relatively expensive, it is difficult to use a driving power supplying apparatus that provides a single voltage level in various devices.

To solve the problem as described above, although an integrated power supplying apparatus is described in the following related art document, such an integrated power supplying apparatus according to the related art includes respective power circuits to provide a variety of voltage levels, which problematically increases a volume of the device and manufacturing costs thereof.

Accordingly, a new power supplying apparatus used for a wide variety of devices by using a single driving power supplying apparatus is required to be developed.

RELATED ART DOCUMENT

Korean Patent Laid-Open Publication No. 10-2011-0062549

SUMMARY OF THE INVENTION

An aspect of the present invention provides a universal power supplying apparatus and a universal power supplying method that can be universally used for various types of devices having a variety of voltage and current levels of a driving power.

According to an aspect of the present invention, there is provided a universal power supplying apparatus including: a power supplying unit that converts an input power into a driving power having a previously set voltage level and supplies the converted power; a power recognizing unit that outputs a recognized voltage having the previously set voltage level to an output terminal from which power is output to recognize connection of a device, and controls a power output of the power supplying unit according to a detected rated output; and a detecting unit that provides a detection voltage having the previously set voltage level to the output terminal.

The power recognizing unit may control the voltage level of the detection voltage to be varied in a previously set voltage level unit when a decreased voltage level of the detection voltage is greater than a reference voltage decrease level.

The power recognizing unit may output the driving power of the power supplying unit when the decreased voltage level of the detection voltage is smaller than the reference voltage decrease level.

The voltage level of the detection voltage may be the same as the voltage level of the driving power.

The detecting unit may vary the voltage level of the driving power and set the voltage level of the detection voltage.

According to another aspect of the present invention, there is provided a universal power supplying apparatus including: a power supplying unit that converts an input power into a driving power having a previously set voltage level and supplies the converted power; a power recognizing unit that recognizes connection of a device according to an impedance variation of an output terminal from which power is output, and controls a power output of the power supplying unit according to a detected rated output; and a detecting unit that provides a detection voltage having the previously set voltage level to the output terminal.

According to another aspect of the present invention, there is provided a universal power supplying method including: detecting a decreased voltage level of a recognized voltage supplied to an output terminal from which power is output; when the decreased voltage level is smaller than a previously set reference voltage level, recognizing that a device is connected to the output terminal and supplying a detection voltage having a previously set voltage level to the output terminal; and when the decreased voltage level of the detection voltage is smaller than a previously set reference voltage decrease level, supplying a driving power having a previously set voltage level to the device connected to the output terminal.

The universal power supplying method may further include: when the decreased voltage level of the detection voltage is greater than the previously set reference voltage decrease level, varying the voltage level of the detection voltage in a previously set voltage level unit.

The universal power supplying method may further include: after the voltage level of the driving power is set, when a decreased voltage level of the driving power is greater than the previously set reference voltage decrease level, varying a current level of the driving power in a previously set current level unit.

According to another aspect of the present invention, there is provided a universal power supplying method including: detecting an impedance variation of a power output terminal; when a degree of impedance variation is greater than a previously set reference value, recognizing that a device is connected to the output terminal and supplying a detection voltage having a previously set voltage level to the output terminal; and when the decreased voltage level of the detection voltage is smaller than a previously set reference voltage decrease level, supplying a driving power having a previously set voltage level to the device connected to the power output terminal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
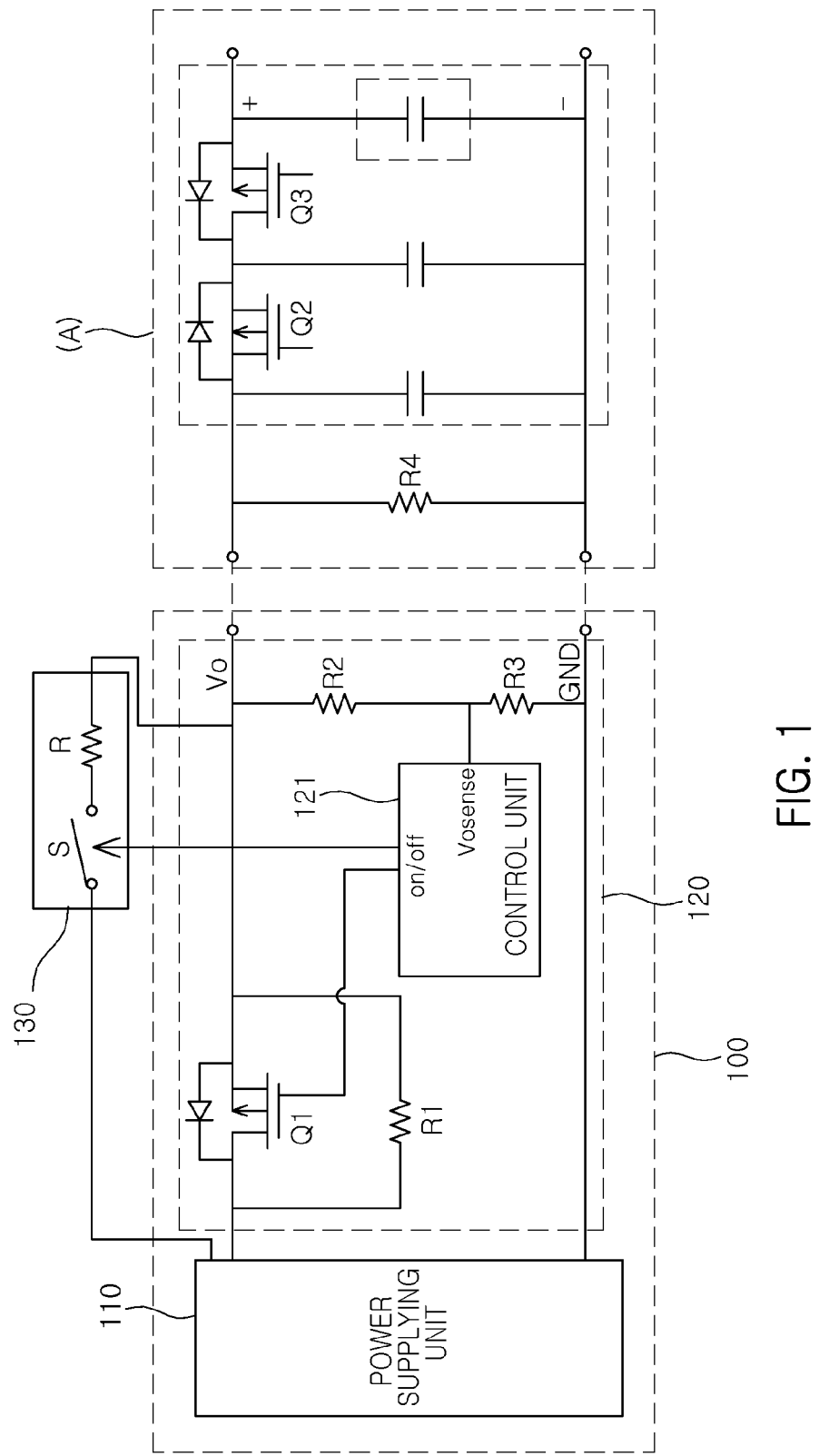
FIG. 1 is a schematic block diagram of a universal power supplying apparatus according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
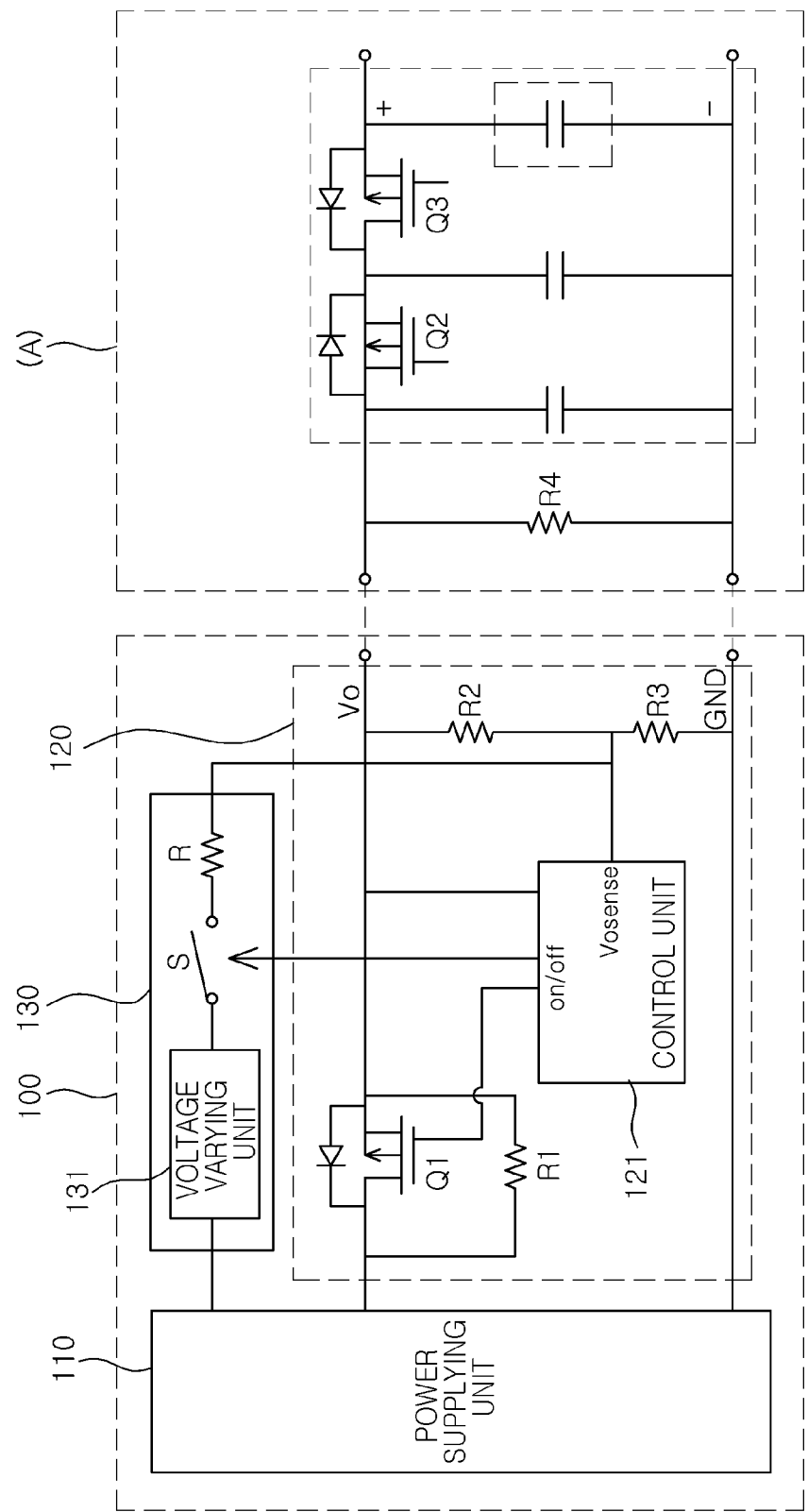
FIG. 2 is a schematic block diagram of a universal power supplying apparatus according to another embodiment of the present invention.

FIGS. 1 and 2 are schematic block diagrams of a universal power supplying apparatus 100 according to embodiments of the present invention.

Referring to FIG. 1, the universal power supplying apparatus 100 according to an embodiment of the present invention may include a power supplying unit 110, a power recognizing unit 120, and a detecting unit 130.

The power supplying unit 110 may vary an input power to a driving power having a previously set voltage level and supply the varied power.

The power recognizing unit 120 may recognize connection of a device A to an output terminal from which power is output, and may transfer the driving power from the power supplying unit 110 to the device A.

As described above, the power recognizing unit 120 may sense an electrical connection of the device A to the output terminal from which the driving power is output, by using an impedance variation in the output terminal or a decreased voltage level of a recognized voltage having the previously set voltage level.

That is, the power recognizing unit 120 may include detection resistors R2 and R3 connected to the output terminal, and may further include a control unit 121 that detects the impedance variation that occurs in coupling of the detection resistor R4 connected to a power input terminal of the device A or outputs the recognized voltage used to recognize the connection of the device A through the output terminal and thus recognizes the connection of the device A.

The control unit 121 may recognize the connection of the device A in a case in which a degree of impedance variation is greater than a previously set reference value or in a case in which the decreased voltage level of the recognized voltage is smaller than a previously set reference level.

In addition, the power recognizing unit 120 may further include a switch Q. The switch Q may be turned on or off under the control of the control unit 121 and conduct electricity through or block a path through which the driving power is supplied from the power supplying unit 110 to the device A through the output terminal.

Meanwhile, although the device A is connected to the output terminal, the driving power having a rating level set by the device A should be supplied to the device A.

Accordingly, the detecting unit 130 may output a detection voltage used to detect a rated power of the device A through the output terminal.

When a voltage level of the detection voltage corresponds to a voltage level of the rated power of the device A, the voltage level is decreased and thus the decreased voltage level is smaller than a previously set reference voltage decrease level. When the voltage level of the detection voltage does not correspond to the voltage level of the rated power of the device A, although the voltage level is decreased, the decreased voltage level will be greater than the previously set reference voltage decrease level.

Therefore, in a case in which the decreased voltage level of the detection voltage is smaller than the previously set reference voltage decrease level, the control unit 121 may control a switch S of the detecting unit 130 to be turned off and stop outputting the detection voltage and control the switch S to be turned on and supply the driving power from the power supplying unit 110 to the device A through the output terminal.

To this end, the detecting unit 130 may include the switch S and a resistor R used to allow a relatively small amount of current to flow through a path through which the detection voltage is transferred.

Meanwhile, in a case in which the decreased voltage level of the detection voltage is greater than the previously set reference voltage decrease level, the control unit 121 may vary the voltage level of the detection voltage in order to detect the rated power of the device A.

To this end, the control unit 121 may control the voltage level of the driving power of the power supplying unit 110 to be varied so that the voltage level of the driving power may be the same as the voltage level of the detection voltage or may control the detecting unit 130 to vary the voltage level of the detection voltage.

To this end, the detection unit 130 may include a voltage varying unit 131 that varies the voltage level of the driving power supplied from the power supplying unit 110 and then varies and sets the voltage level of the detection voltage as shown in FIG. 2.

The above-described variation of the detection voltage may be a change to a previously set voltage level and additionally, the voltage level may be varied in a previously set voltage level unit, for example, in a step way. In this regard, the change of the voltage level may be a gradual increase or decrease.

Figure 3:
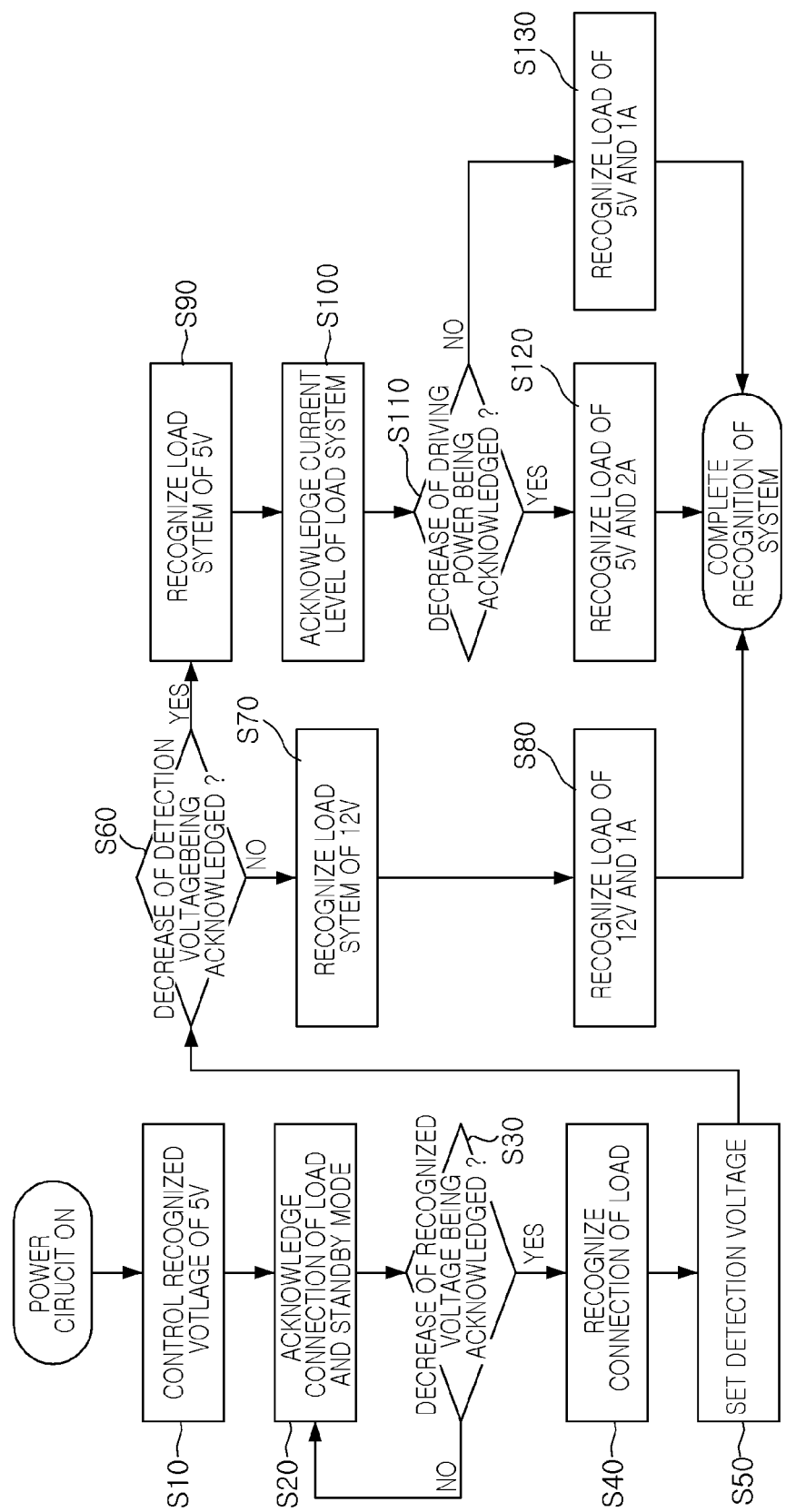
FIG. 3 is a schematic flowchart of a universal power supplying method according to an embodiment of the present invention.
Figure 4:
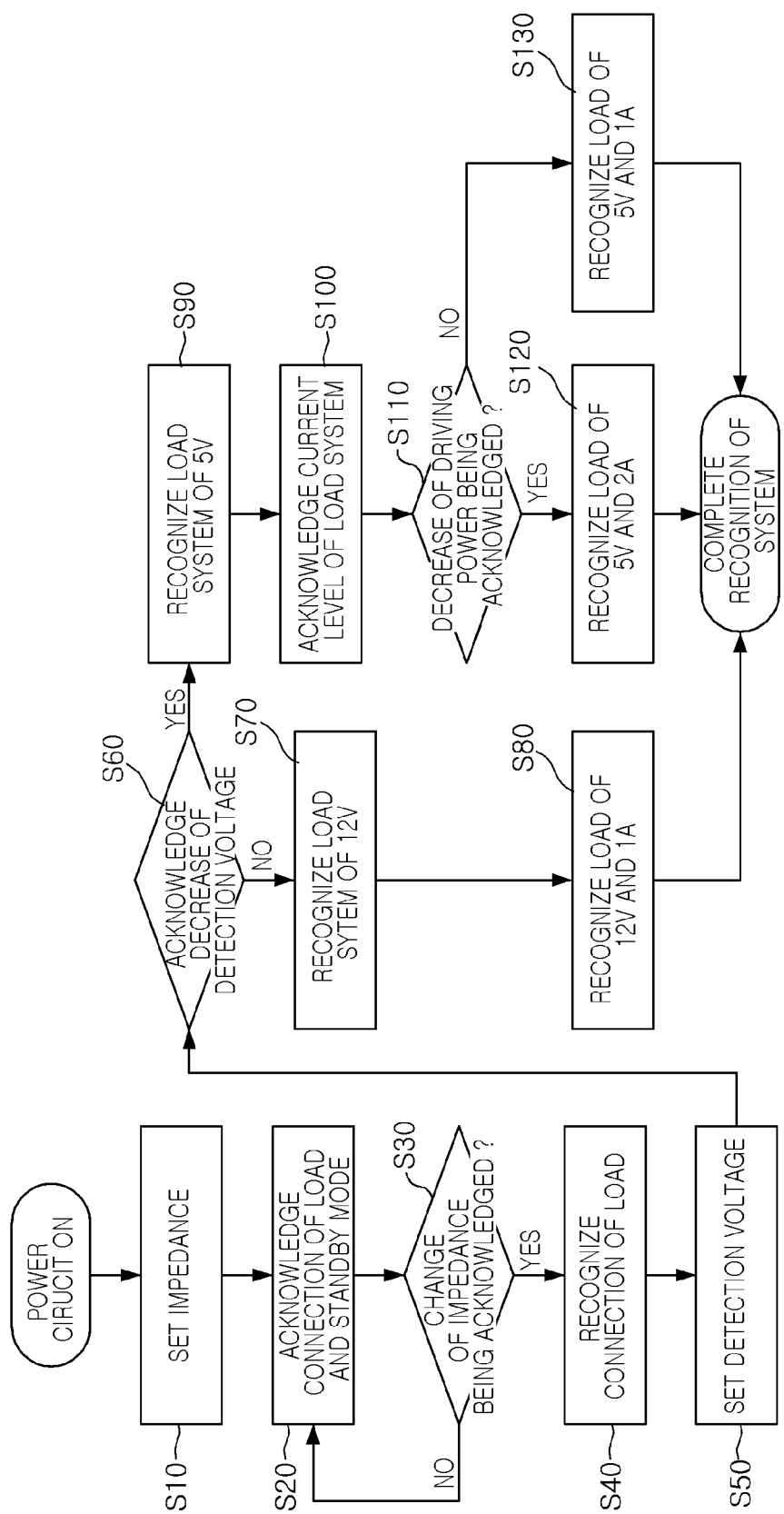
FIG. 4 is a schematic flowchart of a universal power supplying method according to another embodiment of the present invention.

FIGS. 3 and 4 are schematic flowcharts of a universal power supplying method according to embodiments of the present invention.

Referring to FIGS. 3 and 4 along with FIGS. 1 and 2, the universal power supplying method according to an embodiment of the present invention may be performed by first detecting whether a device is connected to an output terminal or not.

As the detection method, as shown in FIG. 3, the control unit 121 may output a recognized voltage through the output terminal and detect a decreased voltage level (S10-S40 of FIG. 3) or detect a degree of impedance variation (S10-S40 of FIG. 4).

In a case in which the device A is recognized according to an impedance variation, the output terminal of the universal power supplying apparatus 100 may include impedance set by the resistors R2 and R3.

Thereafter, when the device A is electrically connected to the output terminal, impedance of the output terminal is changed by the resistor R4 of the device A, and, when the change of the impedance is acknowledged, a connection of the device A, i.e. a connection of a load, to the output terminal may be sensed (S20-S40 of FIG. 4).

Meanwhile, in a case in which the device A is recognized by detecting the decreased voltage level of the recognized voltage, the control unit 121 may output the recognized voltage through the output terminal. In a case in which a resistance component of the output terminal is changed according to the connection of the device A and thus the voltage is decreased, when the decreased voltage level is smaller than a reference voltage level, the connection of the device A to the output terminal may be sensed (S20-S40 of FIG. 3).

Next, since a level of a rated power necessary for driving or charging the device A needs to be recognized (S50), the detecting unit 130 outputs a detection voltage having a previously set voltage level, and the control unit 121 detects a decreased voltage level of the detection voltage (S60) (FIGS. 3 and 4 have the same operations, and thus an identification thereof is omitted).

When the decreased voltage level of the detection voltage is smaller than a previously set reference voltage decrease level, a currently set voltage level is maintained and a driving power having a voltage level corresponding to the currently set voltage level is output. When the decreased voltage level of the detection voltage is greater than the previously set reference voltage decrease level, the voltage level of the detection voltage may be varied.

For example, when a detection voltage having a voltage level of 5V is output and the voltage level of the detection voltage is decreased to about 3V, it is determined that the voltage level satisfies a rating required by the device A, and thus, an output of the detection voltage is stopped, and the driving power having the current voltage level is output to the device A, and further, when the voltage level of the detection voltage is not decreased to about 3V, it is determined that the voltage level does not satisfy the rating required by the device A, and thus, the voltage level of the detection voltage may be varied (S70 and S90).

The variation of the voltage level of the detection voltage may be differently set according to a type of the device A. In a case in which a rated voltage level of the device A to be applied has two types, for example, 5V or 12V, when a voltage drop does not take place at 5V, the voltage level of the driving power may be directly raised to 12V.

Meanwhile, in a case in which the device A has a variety of rated voltage levels, the voltage level of the detection voltage may be varied step by step, and may also be varied repeatedly until a required voltage drop takes place.

Meanwhile, the rated power of the device A may have a voltage level and a current level. The universal power supplying apparatus 100 may set the voltage level of the driving power and then set the current level thereof.

The current level may also be differently set according to a type of a rated current level of the device A to be applied. For example, there may be a case in which a device requires the current level of 1 A or 2 A at the voltage level of 5V.

To this end, after the driving power of 1 A having the same voltage level as the voltage level of the detection voltage of 5V is supplied to the device A, in a case in which the decreased voltage level of the voltage level of the driving power is the same as or similar to the decreased voltage level of the detection voltage, the rated current level is recognized as 1 A and the corresponding current level is maintained, and further, when the voltage drop of the voltage level of the driving power is different from the decreased voltage level of the detection voltage, the current level may be changed to 2 A (S100-S130). Meanwhile, although the device A having the voltage level of 12V is shown to have the current level of 1 A as a rating, this may be modified in various ways (S80).

That is, in a case in which the device A has a variety of rated current levels, the current level of the driving power may be varied step by step, and may also be varied repeatedly until a required voltage drop takes place.

As set forth above, according to embodiments of the invention, a single power supplying apparatus may be universally used for various types of devices having a variety of voltage and current levels of a driving power.

While the present invention has been shown and described in connection with the embodiments, it will be apparent to those skilled in the art that modifications and variations can be made without departing from the spirit and scope of the invention as defined by the appended claims.

What is claimed is:

1. A universal power supplying apparatus comprising:
a power supplying unit that converts an input power into a driving power having a previously set voltage level and supplies the converted power;
a power recognizing unit that outputs a recognized voltage having the previously set voltage level to an output terminal from which power is output to recognize connection of a device, and controls a power output of the power supplying unit according to a detected rated output; and
a detecting unit that provides a detection voltage having the previously set voltage level to the output terminal,
wherein the power recognizing unit controls the voltage level of the detection voltage so as to vary the voltage level of the detection voltage when a decreased voltage level of the detection voltage is greater than a reference voltage decrease level.

2. The universal power supplying apparatus of claim 1, wherein the power recognizing unit controls the voltage level of the detection voltage to be varied in a previously set voltage level unit when the decreased voltage level of the detection voltage is greater than the reference voltage decrease level.

3. The universal power supplying apparatus of claim 2, wherein the power recognizing unit outputs the driving power of the power supplying unit when the decreased voltage level of the detection voltage is smaller than the reference voltage decrease level.

4. The universal power supplying apparatus of claim 1, wherein the voltage level of the detection voltage is the same as the voltage level of the driving power.

5. The universal power supplying apparatus of claim 1, wherein the detecting unit varies the voltage level of the driving power and sets the voltage level of the detection voltage.

6. The universal power supplying apparatus of claim 1, wherein the power recognizing unit controls the voltage level of the detection voltage to be varied in a previously set stepwise manner when the decreased voltage level of the detection voltage is greater than the reference voltage decrease level.

7. A universal power supplying apparatus comprising:
a power supplying unit that converts an input power into a driving power having a previously set voltage level and supplies the converted power;
a power recognizing unit that recognizes connection of a device according to an impedance variation of an output terminal from which power is output, and controls a power output of the power supplying unit according to a detected rated output; and
a detecting unit that provides a detection voltage having the previously set voltage level to the output terminal,
wherein the power recognizing unit controls the voltage level of the detection voltage so as to vary the voltage level of the detection voltage when a decreased voltage level of the detection voltage is greater than a reference voltage decrease level.

8. The universal power supplying apparatus of claim 7, wherein the power recognizing unit controls the voltage level of the detection voltage to be varied in a previously set voltage level unit when the decreased voltage level of the detection voltage is greater than the reference voltage decrease level.

9. The universal power supplying apparatus of claim 8, wherein the power recognizing unit outputs the driving power of the power supplying unit when the decreased voltage level of the detection voltage is smaller than the reference voltage decrease level.

10. The universal power supplying apparatus of claim 7, wherein the voltage level of the detection voltage is the same as the voltage level of the driving power.

11. The universal power supplying apparatus of claim 7, wherein the detecting unit varies the voltage level of the driving power and sets the voltage level of the detection voltage.

12. The universal power supplying apparatus of claim 7, wherein the power recognizing unit controls the voltage level of the detection voltage to be varied in a previously set stepwise manner when the decreased voltage level of the detection voltage is greater than the reference voltage decrease level.

13. A universal power supplying method comprising:
detecting a decreased voltage level of a recognized voltage supplied to an output terminal from which power is output;
when the decreased voltage level is smaller than a previously set reference voltage level, recognizing that a device is connected to the output terminal and supplying a detection voltage having a previously set voltage level to the output terminal;
when the decreased voltage level of the detection voltage is smaller than a previously set reference voltage decrease level, supplying a driving power having a previously set voltage level to the device connected to the output terminal; and
when the decreased voltage level of the detection voltage is greater than the previously set reference voltage decrease level, varying the voltage level of the detection voltage.

14. The universal power supplying method of claim 13, wherein the varying of the voltage level of the detection voltage comprises varying the voltage level of the detection voltage in a previously set voltage level unit.

15. The universal power supplying method of claim 14, further comprising: after the voltage level of the driving power is set, when a decreased voltage level of the driving power is greater than the previously set reference voltage decrease level, varying a current level of the driving power in a previously set current level unit.

16. The universal power supplying method of claim 13, wherein the voltage level of the detection voltage is varied in a previously set stepwise manner when the decreased voltage level of the detection voltage is greater than the reference voltage decrease level.

17. A universal power supplying method comprising:
detecting an impedance variation of a power output terminal;
when a degree of impedance variation is greater than a previously set reference value, recognizing that a device is connected to the output terminal and supplying a detection voltage having a previously set voltage level to the output terminal;
when the decreased voltage level of the detection voltage is smaller than a previously set reference voltage decrease level, supplying a driving power having a previously set voltage level to the device connected to the power output terminal; and
when the decreased voltage level of the detection voltage is greater than the previously set reference voltage decrease level, varying the voltage level of the detection voltage.

18. The universal power supplying method of claim 17, wherein the varying of the voltage level of the detection voltage comprises varying the voltage level of the detection voltage in a previously set voltage level unit.

19. The universal power supplying method of claim 18, further comprising: after the voltage level of the driving power is set, when a decreased voltage level of the driving power is greater than the previously set reference voltage decrease level, varying a current level of the driving power in a previously set current level unit.

20. The universal power supplying apparatus of claim 18, wherein the voltage level of the detection voltage is varied in a previously set stepwise manner when the decreased voltage level of the detection voltage is greater than the reference voltage decrease level.

* * * * *